(12) United States Patent
Lee et al.

(10) Patent No.: US 8,610,398 B2
(45) Date of Patent: Dec. 17, 2013

(54) WIRELESS CHARGING RECEIVER FOR PORTABLE ELECTRONIC DEVICE

(75) Inventors: Yen-Wei Lee, Taipei (TW); Jong-Ding Wang, Taipei (TW)

(73) Assignee: Primax Electronics Ltd., Taipei (TW)

( * ) Notice: Subject to any disclaimer, the term of this patent is extended or adjusted under 35 U.S.C. 154(b) by 417 days.

(21) Appl. No.: 12/984,364

(22) Filed: Jan. 4, 2011

(65) Prior Publication Data

US 2012/0169275 A1    Jul. 5, 2012

(51) Int. Cl.
*H02J 7/00* (2006.01)
(52) U.S. Cl.
USPC ............................. 320/108; 320/114; 320/115
(58) Field of Classification Search
USPC .......................................... 320/108, 114, 115
See application file for complete search history.

(56) References Cited

U.S. PATENT DOCUMENTS

| | | | | |
|---|---|---|---|---|
| 6,978,153 B2* | 12/2005 | Davie et al. | ............... | 455/550.1 |
| 2009/0154095 A1* | 6/2009 | Woud | ....................... | 361/679.56 |
| 2010/0264786 A1* | 10/2010 | Cheng | ....................... | 312/223.1 |
| 2010/0312938 A1* | 12/2010 | Stampfli | ....................... | 710/304 |
| 2011/0309794 A1* | 12/2011 | Budziszek et al. | ............ | 320/114 |

* cited by examiner

*Primary Examiner* — Drew A Dunn
*Assistant Examiner* — Nathaniel Pelton
(74) *Attorney, Agent, or Firm* — Kirton McConkie; Evan R. Witt (57) ABSTRACT

A wireless charging receiver for a portable electronic device is provided. The wireless charging receiver includes a base plate, a wireless charge receiving module, a fastening part and an electric connector. The portable electronic device may be fixed on the base plate of the wireless charging receiver by means of the fastening part. Through the electric connector of the wireless charging receiver, the wireless charge receiving module is electrically connected with the portable electronic device. Consequently, electric power is transmitted to the portable electronic device through the wireless charging receiver to charge the portable electronic device.

8 Claims, 5 Drawing Sheets

WIRELESS CHARGING RECEIVER FOR PORTABLE ELECTRONIC DEVICE

FIELD OF THE INVENTION

The present invention relates to a wireless charging receiver, and more particularly to a wireless charging receiver for a portable electronic device.

BACKGROUND OF THE INVENTION

With increasing development of science and technology, a variety of electronic devices are development toward small size, light weightiness and easy portability in order to comply with the users' requirements. Consequently, various portable electronic devices are produced by the manufacturers of the electronic devices. The common portable electronic devices include for example mobile phones, personal digital assistants (PDAs), handheld game consoles (e.g. PSP, NDSL and Gameboy series game consoles), and the like.

Due to the portability of the portable electronic device, the portable electronic device fails to be connected with the power source at any time. For providing electric power required for powering the portable electronic device, a built-in battery is usually installed in the portable electronic device. The battery is a chargeable battery. Once a power source is available, the chargeable battery of the portable electronic device may be charged by the power source as required.

For example, in a case that the residual battery capacity of the portable electronic device is insufficient, the chargeable battery of the portable electronic device may be charged by a charger. As known, conventional charger has a connecting wire. After the connecting wire is plugged in the portable electronic device and the conventional charger is connected with the power source, electric power may be transmitted from the charger to the portable electronic device through the connecting wire. However, the applications of the charger are usually restricted by the connecting wire. For example, during the process of charging the portable electronic device, the connecting wire usually becomes hindrance from operating the charger.

Recently, with development of a wireless charging technology, a wireless charging device for wirelessly charging the portable electronic device is disclosed. The conventional wireless charging device comprises a first induction coil and a second induction coil. The first induction coil is disposed within the wireless charging device and used as a wireless charge transmission module for transmitting electric power. The second induction coil is connected with a chargeable battery and used as a wireless charge receiving module for receiving electric power. When the wireless charge transmission module (i.e. the first induction coil) within the wireless charging device creates an alternating electromagnetic field, the wireless charge receiving module (i.e. the second induction coil) takes power from the electromagnetic field and converts the power into an electric current. The electric current is transmitted to the chargeable battery to charge the chargeable battery.

However, up to now, the wireless charging technology has not been well established. In addition, it is still a challenge to introduce the wireless charging product into the market. For example, the connecting relationship between the wireless charge transmission module and the wireless charge receiving module and the connecting relationship between the wireless charge receiving module and the portable electronic device should be taken into consideration.

SUMMARY OF THE INVENTION

The present invention provides a wireless charging receiver having a wireless charge receiving module for receiving electric power and outputting the electric power to a portable electronic device.

In accordance with an aspect of the present invention, there is provided a wireless charging receiver for a portable electronic device. The wireless charging receiver is configured to receive electric power from a wireless charging transmitter to charge the portable electronic device. The wireless charging receiver includes a base plate, a wireless charge receiving module, a first fastening part and an electric connector. The base plate has a flat surface. The wireless charge receiving module is disposed on the flat surface for receiving the electric power and outputting the electric power. The first fastening part is extended from a first edge of the flat surface for contacting with a first sidewall of the portable electronic device, so that the first fastening part and the base plate collectively fix the portable electronic device in a space between the flat surface and the first fastening part. The electric connector is disposed on the first fastening part and electrically connected with the wireless charge receiving module. When the electric connector is connected with the portable electronic device, the electric power is transmitted to the portable electronic device through the electric connector.

In an embodiment, there is an included angle between the first fastening part and the flat surface, so that a hook is defined by the first fastening part and the flat surface.

In an embodiment, the portable electronic device further includes a connecting port for accommodating the electric connector, thereby establishing electric connection between the wireless charging receiver and the portable electronic device. When the electric connector is inserted into the connecting port, the portable electronic device is connected with the wireless charge receiving module, so that the electric power is transmitted from the wireless charge receiving module to the portable electronic device through the electric connector and the connecting port.

In an embodiment, the electric connector is a mini USB connector, and the connecting port is a mini USB port.

In an embodiment, the base plate is made of a hard material, and the first fastening part is made of a bendable memory material. By bending the first fastening part, the portable electronic device is permitted to be accommodated within the space between the flat surface and the first fastening part or removed from the space between the flat surface and the first fastening part.

In an embodiment, the wireless charging receiver further includes a second fastening part, which is connected with the flat surface and extended from a second edge of the flat surface. The first fastening part, the second fastening part and the base plate collectively fix the fixing portable electronic device in a receptacle between the first fastening part and the second fastening part.

In an embodiment, there is another included angle between the second fastening part and the flat surface, so that another hook is defined by the second fastening part and the flat surface.

In an embodiment, the second fastening part is made of a bendable memory material. By bending the second fastening part, the portable electronic device is permitted to be accommodated within the receptacle between the first fastening part and the second fastening part or removed from the receptacle between the first fastening part and the second fastening part.

In an embodiment, the second fastening part is made of a hard material, and the first fastening part is made of a bendable memory material. By bending the first fastening part, the portable electronic device is permitted to be accommodated within the receptacle between the first fastening part and the second fastening part or removed from the receptacle between the first fastening part and the second fastening part.

In an embodiment, the wireless charging receiver further includes a frame member, which is selectively coupled with or detached from the base plate. When the frame member is coupled with the base plate, the portable electronic device is permitted to be accommodated within a space between the base plate and the frame member. Whereas, when the frame member is detached from the base plate, the portable electronic device is permitted to be removed from the space between the base plate and the frame member. Moreover, the base plate and the frame member are made of hard materials.

In an embodiment, the frame member includes a frame body and a frame sidewall. The frame sidewall is connected with the frame body and extended from an edge of the frame body. There is another included angle between the frame body and the frame sidewall, so that another hook is defined by the frame body and the frame sidewall.

In an embodiment, the base plate further includes a perforation. When the portable electronic device is fixed in the space between the flat surface and the first fastening part, a camera module of the portable electronic device is exposed through the perforation.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

For obviating the drawbacks encountered from the prior art, the present invention provides a wireless charging receiver for a portable electronic device.

Figure 1:
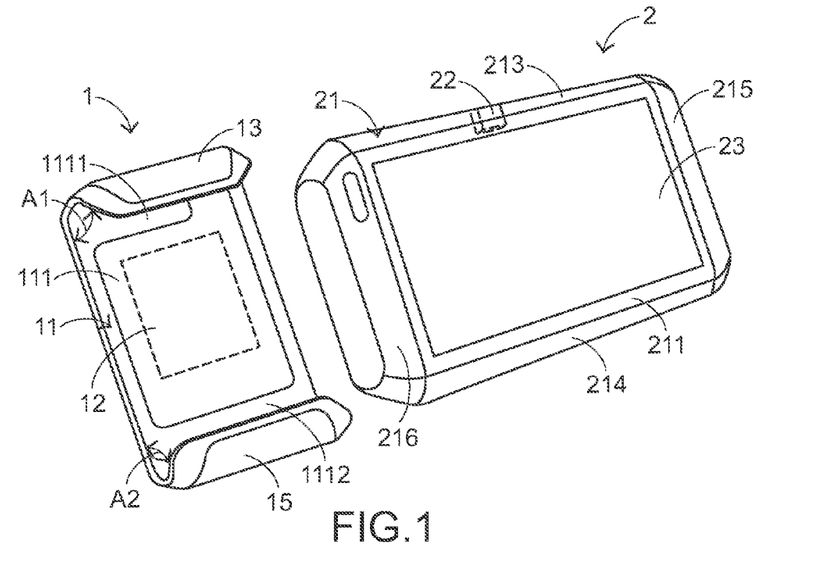
FIG. 1 is a schematic perspective view illustrating the relationship between a wireless charging receiver and a portable electronic device according to a first embodiment of the present invention.
Figure 2:
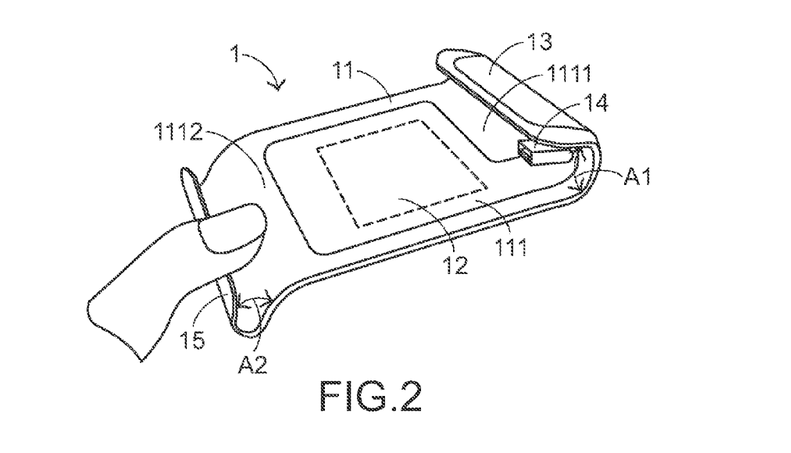
FIG. 2 is a schematic perspective view illustrating the wireless charging receiver in a bent status according to the first embodiment of the present invention.

Please refer to FIGS. 1 and 2. FIG. 1 is a schematic perspective view illustrating the relationship between a wireless charging receiver and a portable electronic device according to a first embodiment of the present invention. FIG. 2 is a schematic perspective view illustrating the wireless charging receiver in a bent status according to the first embodiment of the present invention. In FIG. 1, a wireless charging receiver 1 and a portable electronic device 2 are shown. The portable electronic device 2 comprises a main body 21, a connecting port 22, a display screen 23 and a camera module 24 (see FIG. 3). In the portable electronic device 2, the display screen 23 is installed on a first surface 211 of the main body 21 for displaying a graphic-based window, the connecting port 22 is disposed in a first sidewall 213 of the main body 21, and the camera module 24 is installed on a second surface 212 of the main body 21 for shooting an object to acquire an image. In this embodiment, the portable electronic device 2 is a mobile phone, and the connecting port 22 is a mini universal series bus (Mini USB) port.

The wireless charging receiver 1 comprises a base plate 11, a wireless charge receiving module 12, a first fastening part 13, an electric connector 14 and a second fastening part 15. The base plate 11 has a flat surface 111. The wireless charge receiving module 12 is disposed on the flat surface 111. The wireless charge receiving module 12 is configured to receive electric power from a wireless charging transmitter 3 (see FIG. 5) and output the electric power. In this embodiment, the wireless charge receiving module 12 comprises an induction coil and a charging circuit. The operating principles of the induction coil and the charging circuit are well known in the art, and are not redundantly described herein. The first fastening part 13 is connected with the flat surface 111 and extended from a first edge 1111 of the flat surface 111. In such way, the first fastening part 13 and the base plate 11 collectively fix the portable electronic device 2 in a space between the flat surface 111 and the first fastening part 13. Similarly, the second fastening part 15 is connected with the flat surface 111 and extended from a second edge 1112 of the flat surface 111. In such way, the second fastening part 15 and the base plate 11 collectively fix the portable electronic device 2 in a space between the flat surface 111 and the second fastening part 15.

The electric connector 14 is disposed on the first fastening part 13, and electrically connected with the wireless charge receiving module 12. After the electric connector 14 is inserted into the connecting port 22 of the portable electronic device 2, the portable electronic device 2 and the wireless charging receiver 1 are electrically connected with each other. In such way, electric power can be transmitted to the portable electronic device 2 through the electric connector 14. In this embodiment, since the connecting port 22 is a Mini USB port, the electric connector 14 is a Mini USB connector.

Please refer to FIGS. 1 and 2 again. There is a first included angle A1 between the first fastening part 13 and the flat surface 111, so that a hook is defined by the first fastening part 13 and the flat surface 111. Similarly, there is a second included angle A2 between the second fastening part 15 and the flat surface 111, so that another hook is defined by the second fastening part 15 and the flat surface 111. In this embodiment, the first included angle A1 is equal to the second included angle A2. In this embodiment, the base plate 11 is made of a hard material, and the first fastening part 13 and the second fastening part 15 are made of a bendable memory material. The base plate 11, the first fastening part 13 and the second fastening part 15 are produced by a double injection process. Since the base plate 11 is made of a hard material, after the wireless charge receiving module 12 is disposed on the flat surface 111, the possibility of bending or damaging the wireless charge receiving module 12 will be minimized or eliminated. Moreover, the wireless charge receiving module 12 and the electric connector 14 are connected with each other through a flexible printed circuit (FPC) (not shown). Due to the flexibility of the flexible printed circuit, if the first fastening part 13 is bent, the wireless charge receiving module 12 and the electric connector 14 are not adversely affected. That is, although the electric connector 14 is disposed on the first fastening part 13, if the first fastening part 13 is bent, the electric connection between the wireless charge receiving module 12 and the electric connector 14 is not impaired. Similarly, the second fastening part 15 is bendable. In FIG. 2, a bent second fastening part 15 is shown.

In some embodiments, for protecting the wireless charge receiving module 12 and the electric connector 14, the first fastening part 13 may be made of a hard material. Since the first fastening part 13 made of a hard material is inflexible, the first fastening part 13 fails to be bent. Under this circumstance, the second fastening part 15 is made of a bendable memory material. That is, after the second fastening part 15 is bent, the portable electronic device 2 may be accommodated within the wireless charging receiver 1 or removed from the wireless charging receiver 1.

Figure 3:
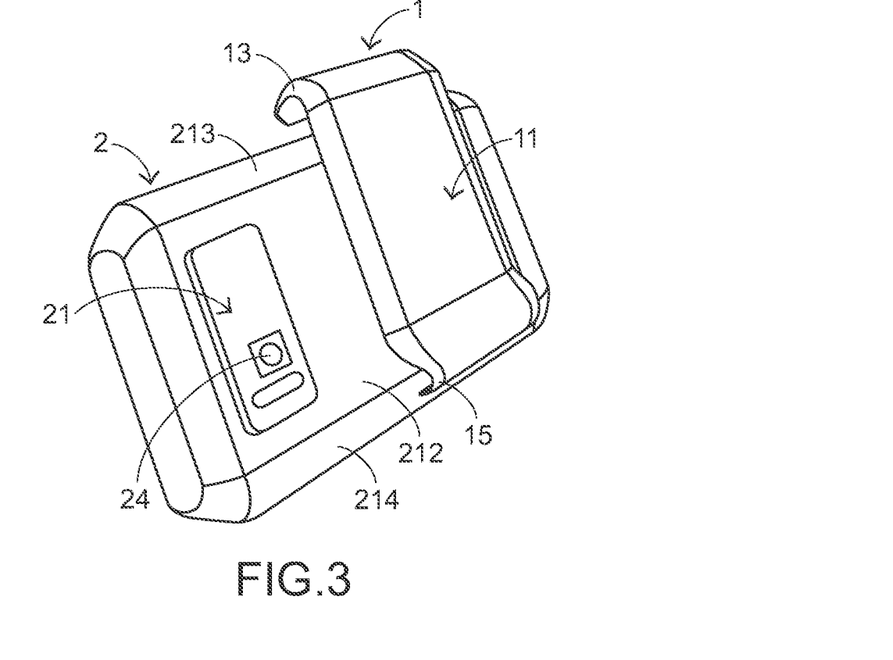
FIG. 3 is a schematic perspective view illustrating the relationship between the wireless charging receiver and the portable electronic device of FIG. 1 taken along another viewpoint.
Figure 4:
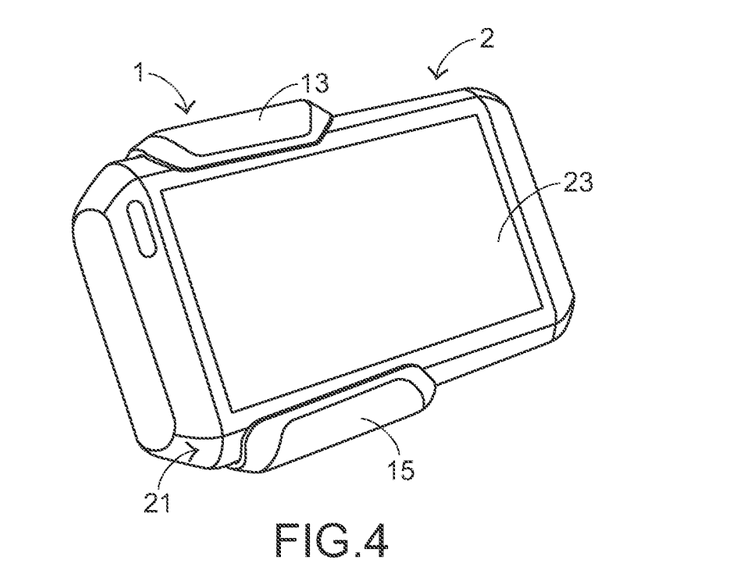
FIG. 4 is a schematic perspective view illustrating the assembly of the wireless charging receiver and the portable electronic device of FIG. 1.

FIG. 3 is a schematic perspective view illustrating the relationship between the wireless charging receiver and the portable electronic device of FIG. 1 and take along another viewpoint. A process of combining the portable electronic device 2 with the wireless charging receiver 1 will be illustrated as follows. Firstly, the second fastening part 15 is bent downwardly. Then, the wireless charging receiver 1 is moved toward the portable electronic device 2 in the direction facing the first sidewall 213 of the main body 21 such that the electric connector 14 is aligned with the connecting port 22. Then, the electric connector 14 is inserted into the connecting port 22, so that the portable electronic device 2 and the wireless charging receiver 1 are combined together and the electric connection between the portable electronic device 2 and the wireless charging receiver 1 is established. Then, the second surface 212 of the main body 21 of the portable electronic device 2 is contacted with the flat surface 111 of the wireless charging receiver 1. Afterwards, the bent second fastening part 15 is restored to the original state, so that the first fastening part 13 is contacted with the first sidewall 213 of the main body 21 and the second fastening part 15 is contacted with the second sidewall 214 of the main body 21. In this situation, the portable electronic device 2 is fixed between the first fastening part 13 and the second fastening part 15 (see FIG. 4). Moreover, as shown in FIG. 3, after the portable electronic device 2 is fixed by the wireless charging receiver 1, the camera module 24 of the portable electronic device 2 is not sheltered by the base plate 11, so that the shooting function of the camera module 24 is available.

Figure 5:
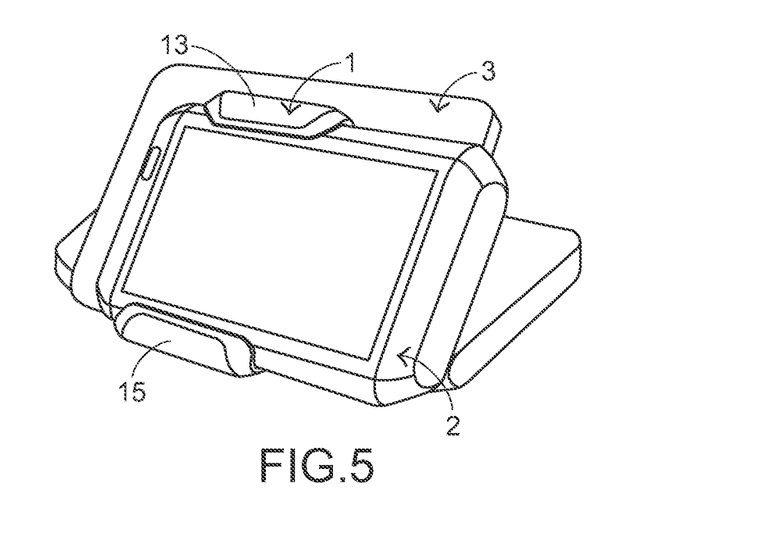
FIG. 5 is schematic perspective view illustrating a system of receiving electric power from the wireless charging transmitter and transmitting electric power to the portable electronic device by the wireless charging receiver according to the first embodiment of the present invention.

FIG. 5 is schematic perspective view illustrating a system of receiving electric power from the wireless charging transmitter and transmitting electric power to the portable electronic device by the wireless charging receiver according to the first embodiment of the present invention. For allowing the portable electronic device 2 to receive the electric power from the wireless charging transmitter 3, the wireless charging receiver 1 that is connected with the portable electronic device 2 should be contacted with the wireless charging transmitter 3. Consequently, the electric power may be transmitted from the wireless charging transmitter 3 to the wireless charge receiving module 12 of the wireless charging receiver 1 according to a wireless transmission technology. The electric power is then transmitted to the portable electronic device 2 through the wireless charge receiving module 12, the electric connector 14 and the connecting port 22, thereby charging the chargeable battery (not shown) of the portable electronic device 2.

In this embodiment, the wireless charging receiver 1 comprises a bendable first fastening part 13, a bendable second fastening part 15 and a non-bendable base plate 11. By simply bending the first fastening part 13 and the second fastening part 15, the portable electronic device 2 may be accommodated within the receptacle between the first fastening part 13 and the second fastening part 15 or removed from the receptacle between the first fastening part 13 and the second fastening part 15.

Figure 6:
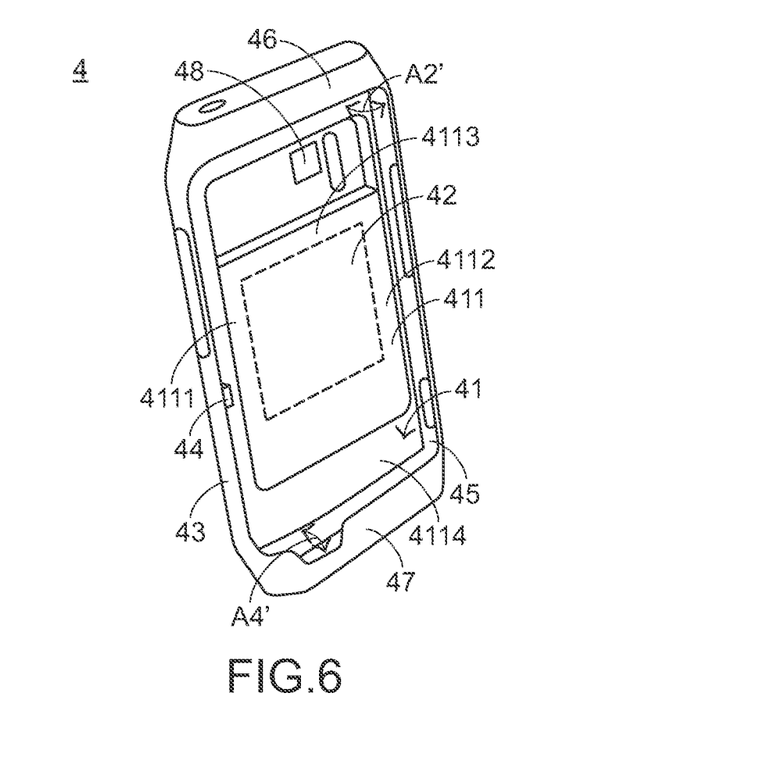
FIG. 6 is a schematic perspective view illustrating a wireless charging receiver for a portable electronic device according to a second embodiment of the present invention.

FIG. 6 is a schematic perspective view illustrating a wireless charging receiver for a portable electronic device according to a second embodiment of the present invention. The wireless charging receiver 4 comprises a base plate 41, a wireless charge receiving module 42, a first fastening part 43, an electric connector 44, a second fastening part 45, a third fastening part 46, a fourth fastening part 47 and a perforation 48. The base plate 41 has a flat surface 411. The wireless charge receiving module 42 is disposed on the flat surface 411. The wireless charge receiving module 42 is configured to receive electric power from a wireless charging transmitter 3 (see FIG. 5) and output the electric power.

The first fastening part 43 is connected with the flat surface 411 and extended from a first edge 4111 of the flat surface 411. In such way, the first fastening part 43 and the base plate 41 collectively fix the portable electronic device 2 in a space between the flat surface 411 and the first fastening part 43. Similarly, the second fastening part 45 is connected with the flat surface 411 and extended from a second edge 4112 of the flat surface 411. In such way, the second fastening part 45 and the base plate 41 collectively fix the portable electronic device 2 in a space between the flat surface 411 and the second fastening part 45.

Similarly, the third fastening part 46 is connected with the flat surface 411 and extended from a third edge 4113 of the flat surface 411. In such way, the third fastening part 46 and the base plate 41 collectively fix the portable electronic device 2 in a space between the flat surface 411 and the third fastening part 46. Similarly, the fourth fastening part 47 is connected with the flat surface 411 and extended from a fourth edge 4114 of the flat surface 411. In such way, the fourth fastening part 47 and the base plate 41 collectively fix the portable electronic device 2 in a space between the flat surface 411 and the fourth fastening part 47.

The electric connector 44 is disposed on the first fastening part 43, and electrically connected with the wireless charge receiving module 42. After the electric connector 44 is inserted into the connecting port 22 of the portable electronic device 2, the portable electronic device 2 and the wireless charging receiver 1 are electrically connected with each other.

In such way, electric power may be transmitted to the portable electronic device 2 through the electric connector 44. In addition, the perforation 48 is formed in the base plate 41.

Please refer to FIG. 6 again. There is a first included angle (not shown) between the first fastening part 43 and the flat surface 411, so that a hook is defined by the first fastening part 43 and the flat surface 411. Similarly, there is a second included angle A2' between the second fastening part 45 and the flat surface 411, so that another hook is defined by the second fastening part 45 and the flat surface 411. Similarly, there is a third included angle (not shown) between the third fastening part 46 and the flat surface 411, so that another hook is defined by the third fastening part 46 and the flat surface 411. Similarly, there is a fourth included angle A4' between the fourth fastening part 47 and the flat surface 411, so that another hook is defined by the fourth fastening part 47 and the flat surface 411. In this embodiment, the first included angle is equal to the second included angle A2', and the third included angle is equal to the fourth included angle A4'.

In this embodiment, the base plate 41 is made of a hard material; and the first fastening part 43, the second fastening part 45, the third fastening part 46 and the fourth fastening part 47 are made of bendable memory materials. The wireless charge receiving module 42 is disposed on the flat surface 411 of the base plate 41. Since the base plate 41 is made of a hard material, the possibility of bending or damaging the wireless charge receiving module 42 will be minimized or eliminated. Moreover, the electric connector 44 disposed on the first fastening part 43 is connected with the wireless charge receiving module 42 through a flexible printed circuit (FPC) (not shown). Due to the flexibility of the flexible printed circuit, if the first fastening part 43 is bent, the electric connection between the wireless charge receiving module 42 and the electric connector 44 is not impaired.

Figure 7:
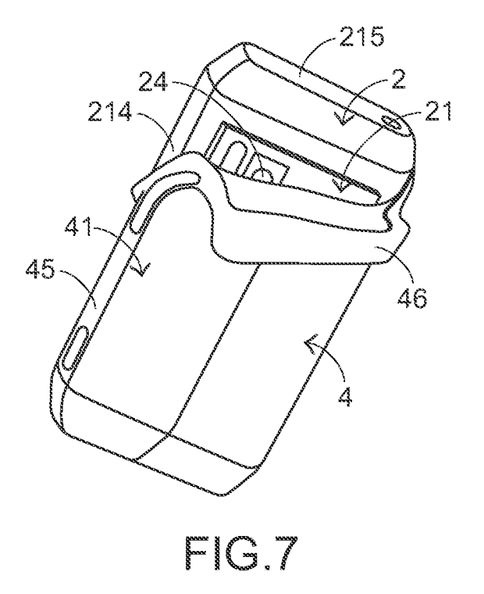
FIG. 7 is a schematic perspective view illustrating a portable electronic device enclosed by the wireless charging receiver of FIG. 6.
Figure 8:
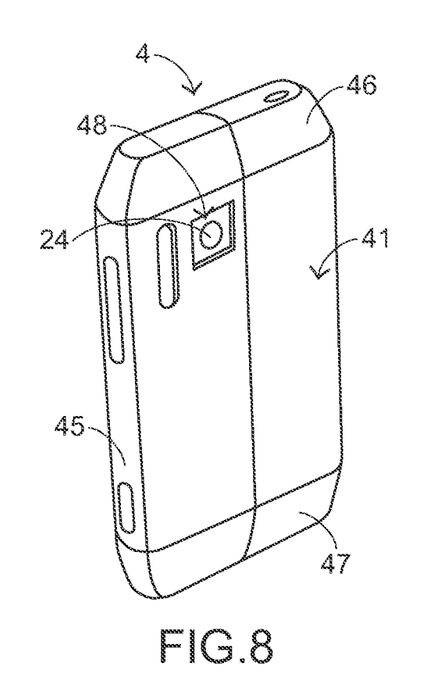
FIG. 8 is a schematic perspective view illustrating the assembly of the portable electronic device and the wireless charging receiver of FIG. 7 taken along another viewpoint.

FIG. 7 is a schematic perspective view illustrating a portable electronic device enclosed by the wireless charging receiver of FIG. 6. A process of combining the portable electronic device 2 with the wireless charging receiver 4 will be illustrated as follows. Firstly, the third fastening part 46 is bent downwardly to expose a receptacle for accommodating the portable electronic device 2. Then, the portable electronic device 2 is introduced into the receptacle of the wireless charging receiver 4 in the direction from the third edge 4113 of the flat surface 411 to the fourth edge 4114 of the flat surface 411 of the wireless charging receiver 4. Then, the first fastening part 43 is bent downwardly, so that the electric connector 44 on the first fastening part 43 no longer becomes hindrance from introducing the portable electronic device 2 into the receptacle of the wireless charging receiver 4. After a fourth sidewall 216 of the main body 21 of the portable electronic device 2 is contacted with the fourth fastening part 47 and the second sidewall 214 of the main body 21 is contacted with the second fastening part 45, the bent first fastening part 43 is restored to the original state and the electric connector 44 on the first fastening part 43 is inserted into the connecting port 22. Meanwhile, the portable electronic device 2 and the wireless charging receiver 4 are combined together. Afterwards, the bent third fastening part 46 is restored to the original state, so that the third fastening part 46 is contacted with the third sidewall 215 of the main body 21. In this situation, the portable electronic device 2 is fixed between the first fastening part 43, the second fastening part 45, the third fastening part 46 and the fourth fastening part 47. That is, the portable electronic device 2 is fixed and enclosed by the wireless charging receiver 4. Moreover, as shown in FIG. 8, after the portable electronic device 2 is fixed by the wireless charging receiver 4, the camera module 24 of the portable electronic device 2 is exposed through the perforation 48 of the base plate 41. Since the camera module 24 is not sheltered by the base plate 41, the shooting function of the camera module 24 is available.

Like the wireless charging receiver 1 of the first embodiment, by simply placing the wireless charging receiver 4 on the wireless charging transmitter 3 or contacting the wireless charging receiver 4 with the wireless charging transmitter 3, the electric power from the wireless charging transmitter 3 can be received by the wireless charging receiver 4, thereby wirelessly charging the portable electronic device 2.

Figure 9:
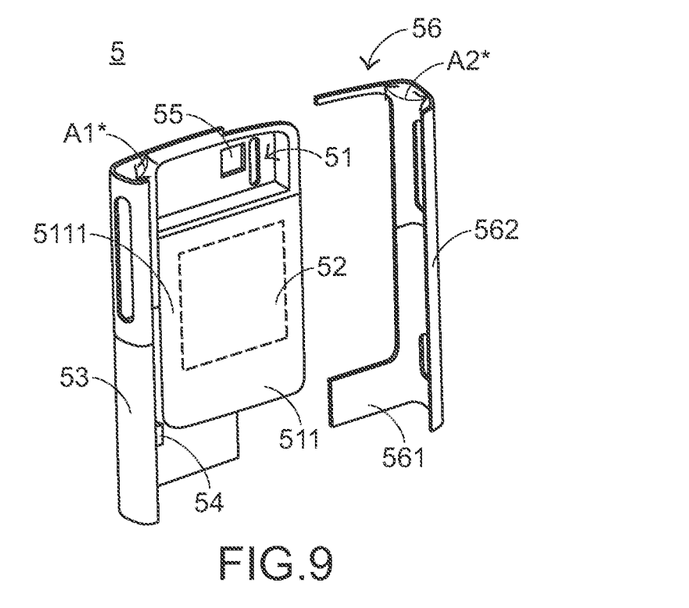
FIG. 9 is a schematic perspective view illustrating a wireless charging receiver for a portable electronic device according to a third embodiment of the present invention.

FIG. 9 is a schematic perspective view illustrating a wireless charging receiver for a portable electronic device according to a third embodiment of the present invention. The wireless charging receiver 5 comprises a base plate 51, a wireless charge receiving module 52, a fastening part 53, an electric connector 54, a perforation 55 and a frame member 56. The base plate 51 has a flat surface 511. The wireless charge receiving module 52 is disposed on the flat surface 511. The wireless charge receiving module 52 is configured to receive electric power from a wireless charging transmitter 3 (see FIG. 5) and output the electric power. The fastening part 53 is connected with the flat surface 511 and extended from a first edge 5111 of the flat surface 511. In such way, the fastening part 53 and the base plate 51 collectively fix the portable electronic device 2 in a space between the flat surface 511 and the fastening part 53.

The electric connector 54 is disposed on the fastening part 53 and electrically connected with the wireless charge receiving module 52. After the electric connector 54 is inserted into the connecting port 22, the electric connection between the portable electronic device 2 and the wireless charging receiver 5 is established, so that the electric power may be transmitted to the portable electronic device 2. The perforation 55 is formed in the base plate 51. The frame member 56 is selectively coupled with or detached from the base plate 51. In this embodiment, the base plate 51 and the frame member 56 are made of hard materials.

Please refer to FIG. 9 again. The frame member 56 comprises a frame body 561 and a frame sidewall 562. The frame sidewall 562 is connected with the frame body 561, and extended from an edge of the frame body 561. In addition, there is an included angle A2* between the frame body 561 and the frame sidewall 562, so that a hook is defined by the frame body 561 and the frame sidewall 562. Whereas, there is another included angle A1* between the fastening part 53 and the flat surface 511, so that another hook is defined by the fastening part 53 and the flat surface 511. In this embodiment, the another included angle A1* is equal to the included angle A2*.

The operations of the portable electronic device 2 and the wireless charging receiver 5 will be illustrated as follows. Firstly, the electric connector 54 on the fastening part 53 is inserted into the connecting port 22 of the portable electronic device 2, so that the portable electronic device 2 and the wireless charging receiver 5 are combined together. Meanwhile, the first sidewall 213 of the main body 21 of the portable electronic device 2 is connected with the fastening part 53, and the second surface 212 of the main body 21 of the portable electronic device 2 is contacted with the flat surface 511 of the wireless charging receiver 5. Then, the frame member 56 is coupled with the base plate 51, wherein the frame sidewall 562 is connected with the second sidewall 214 of the main body 21. Due to the hook defined by the base plate 51 and the frame member 56, the portable electronic device 2 is permitted to be fixed between the base plate 51 and the frame member 56 (see FIG. 10). Moreover, as shown in FIG.

Figure 10:
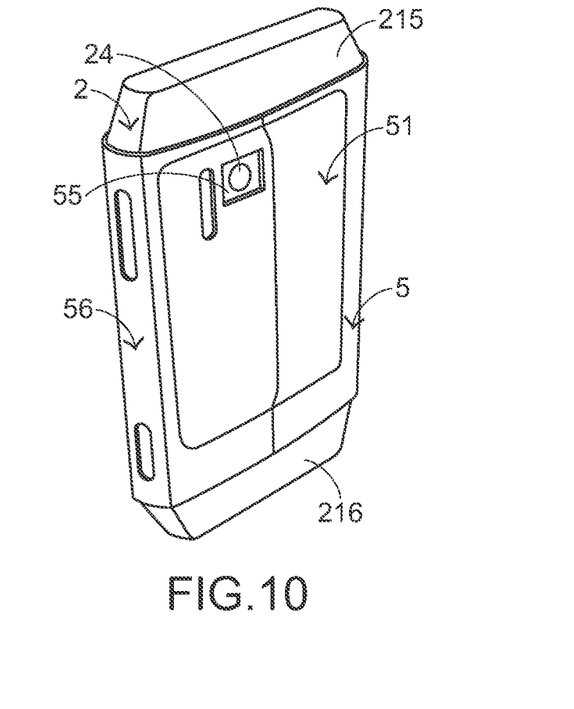
FIG. 10 is a schematic perspective view illustrating the assembly of the portable electronic device and the wireless charging receiver of FIG. 9 taken along another viewpoint.

10, after the portable electronic device 2 is fixed by the wireless charging receiver 5, the camera module 24 of the portable electronic device 2 is exposed through the perforation 55 of the base plate 51. Since the camera module 24 is not sheltered by the base plate 51, the shooting function of the camera module 24 is available.

A process of receiving the electric power from the wireless charging transmitter 3 by the wireless charging receiver 5 is similar to that illustrated in the above embodiments, and is not redundantly described herein. In this embodiment, the base plate 51 and the frame member 56 of the wireless charging receiver 5 are made of hard materials. By simply separating the frame member 56 from the base plate 51, the portable electronic device 2 may be accommodated within the space between the base plate 51 and the frame member 56 or removed from the space between the base plate 51 and the frame member 56.

From the above description, the wireless charging receiver of the present invention is capable of fixing a portable electronic device in a space between the base plate and the fastening part. In addition, after the electric connector on the fastening part is inserted into the connecting port of the portable electronic device, the wireless charging receiver is electrically connected with the portable electronic device to transmit electric power to the portable electronic device. That is, the wireless charging receiver of the present invention is capable of structurally fixing the portable electronic device. In addition, through the wireless charging receiver, the portable electronic device is connected with a wireless charge receiving module. Moreover, by simply contacting the wireless charging receiver with the wireless charging transmitter, the wireless charging receiver can receive electric power to perform a wireless charging task.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A wireless charging receiver for a portable electronic device, said wireless charging receiver being configured to receive electric power from a wireless charging transmitter to charge said portable electronic device, said wireless charging receiver comprising:
   a base plate having a flat surface;
   a wireless charge receiving module disposed on said flat surface for receiving said electric power and outputting said electric power;
   a first fastening part and a second fastening part extending from a first edge and a second edge of said flat surface for contacting with a first sidewall and a second sidewall of said portable electronic device, respectively, so that said first fastening part, said second fastening part and said base plate collectively fix said portable electronic device in a space defined thereamong, wherein there is an included angle between said first fastening part and said flat surface, so that a hook is defined by said first fastening part and said flat surface and wherein there is another included angle between said second fastening part and said flat surface, so that a hook is defined by said second fastening part and said flat surface; and
   an electric connector disposed on said first fastening part and electrically connected with said wireless charge receiving module, wherein a configuration of said second fastening part relative to said flat surface is changeable so as to sustain said portable electronic device received in said space against said electric connector or release said portable electronic device from said space, and when said electric connector is connected with said portable electronic device, said electric power is transmitted to said portable electronic device through said electric connector.

2. The wireless charging receiver according to claim 1 wherein said portable electronic device further comprises a connecting port for accommodating said electric connector, thereby establishing electric connection between said wireless charging receiver and said portable electronic device, wherein when said electric connector is inserted into said connecting port, said portable electronic device is connected with said wireless charge receiving module, so that said electric power is transmitted from said wireless charge receiving module to said portable electronic device through said electric connector and said connecting port.

3. The wireless charging receiver according to claim 2 wherein said electric connector is a mini USB connector, and said connecting port is a mini USB port.

4. The wireless charging receiver according to claim 1 wherein said base plate is made of a hard material, and said second fastening part is made of a bendable memory material, wherein by bending said second fastening part, said portable electronic device is permitted to be put into said space or removed from said space.

5. The wireless charging receiver according to claim 1 wherein said second fastening part is a frame member, which is selectively coupled with or detached from said base plate, thereby changing said configuration of said second fastening part, wherein said base plate and said frame member are made of hard materials.

6. The wireless charging receiver according to claim 1 wherein said base plate further comprises a perforation, wherein when said portable electronic device is fixed in said space, a camera module of said portable electronic device is exposed through said perforation.

7. The wireless charging receiver according to claim 1 wherein said first edge and said second edge are opposite edges of said flat surface.

8. The wireless charging receiver according to claim 1 wherein said first edge and said second edge are adjacent edges of said flat surface.

* * * * *